United States Patent
Park et al.

(10) Patent No.: US 7,751,834 B2
(45) Date of Patent: Jul. 6, 2010

(54) INTUITIVE REAL SPATIAL AIMING-BASED SYSTEM, IDENTIFICATION AND COMMUNICATION METHODS FOR IDENTIFYING NEAR BY DEVICES TO FORM A NETWORK WITHIN A REGION

(75) Inventors: Kyu-Ho Park, Gongju Chungcheongnam-do (KR); Woohun Lee, Daejeon (KR); Sung Hoon Baek, Daejon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 678 days.

(21) Appl. No.: 11/508,525

(22) Filed: Aug. 23, 2006

(65) Prior Publication Data

US 2007/0066323 A1    Mar. 22, 2007

(30) Foreign Application Priority Data

Sep. 22, 2005    (KR) ...................... 10-2005-0088120

(51) Int. Cl.
H04W 24/00    (2009.01)
(52) U.S. Cl. .................... 455/456.2; 455/418; 455/419; 455/420; 701/213; 345/157; 345/158
(58) Field of Classification Search ................ 455/41.2, 455/418–420, 456.1–457
See application file for complete search history.

(56) References Cited

U.S. PATENT DOCUMENTS

| | | | |
|---|---|---|---|
| 5,745,116 A | 4/1998 | Pisutha-Arnond | |
| 2002/0190947 A1* | 12/2002 | Feinstein | ................... 345/158 |
| 2004/0003133 A1* | 1/2004 | Pradhan et al. | ............. 709/318 |
| 2005/0246098 A1* | 11/2005 | Bergstrom et al. | .......... 701/213 |

OTHER PUBLICATIONS

Session: Late breaking results: short papers table of contents Conference on Human Factors in Computing Systems archive CHI '05 extended abstracts on Human factors in computing systems table of contents Portland, OR, USA, pp. 1881-1884, Year of Publication: 2005 ,ISBN:1-59593-002-7 http://portal.acm.org/citation.cfm?id=1056808.1057046.*

(Continued)

*Primary Examiner*—Nick Corsaro
*Assistant Examiner*—Chuong A Ngo
(74) *Attorney, Agent, or Firm*—Bachman & LaPointe, P.C.

(57) ABSTRACT

An intuitive real spatial aiming-based system and identification and communication methods are presented. The intuitive real spatial aiming-based system includes aiming device, target devices and an indoor location-based service server. The aiming device includes a mobile computer or a Personal Digital Assistant (PDA), which is provided with a first wireless communication tool, a first location tracking sensor, and an electronic compass having a magneto resistive sensor for detecting a directions. The target devices each includes a fixed computer, a home appliance, a PDA, or a mobile communication terminal, which is selectively provided with second wireless communication tool and a second location tracking sensor. The indoor location-based service server tracks the indoor locations and coordinates the aiming device and the target devices in real time. To tolerate sensor's error, an angle-based target region, a width-based target region, and a combination of the two regions presented.

2 Claims, 10 Drawing Sheets

OTHER PUBLICATIONS

Title: Use that there! : pointing to establish device identity Authors: Swindells, Colin Edward Issue Date: 2002 Description: Thesis (M.Sc. (Computing Sc.))—Simon Fraser University, 2002 URL: http://ir.lib.sfu.ca/handle/1892/8736, Appears in Collections: Theses, Dissertations, and other Required Graduate Degree Essays.*

Portland, OR, USA pp. 1881-1884 Year of Publication: 2005,ISBN:1-59593-002-7 http://portal.acm.org/citation.cfm?id=1056808.1057046.*

Authors: Swindells, Colin Edward, Issue Date: 2002, Description: Thesis (M.Sc. (Computing Sc.))—Simon Fraser University, 2002, URI: http://ir.lib.sfu.ca/handle/1892/8736, Appears in Collections: Theses, Dissertations, and other Required Graduate Degree Essays.*

Toss-it: intuitive information transfer techniques for mobile devices, pp. 1881-1884, Year of Publication: 2005, ISBN:1-59593-002-7, Authors Koji Yatani University of Tokyo, Chiba, Japan Koiti Tamura, Keiichi, Hiroki, Masanori Sugimoto University of Tokyo, Chiba.*

"Configuring Gestures as Expressive Interactions to Navigate Multimedia Recordings from Visits on Multiple Projections", MUM 2004, pp. 157-164, Oct. 27-29, 2004.

"Point & Click-Interaction in Smart Environments", HUC'99, LNCS 1707, pp. 311-313, 1999.

"Spontaneous Interaction with Everyday Devices Using a PDA" by Matthias Ringwald.

"That one there! Pointing to establish device identity", UIST'02, Oct. 27-30, 2002.

* cited by examiner

[Figure 1]
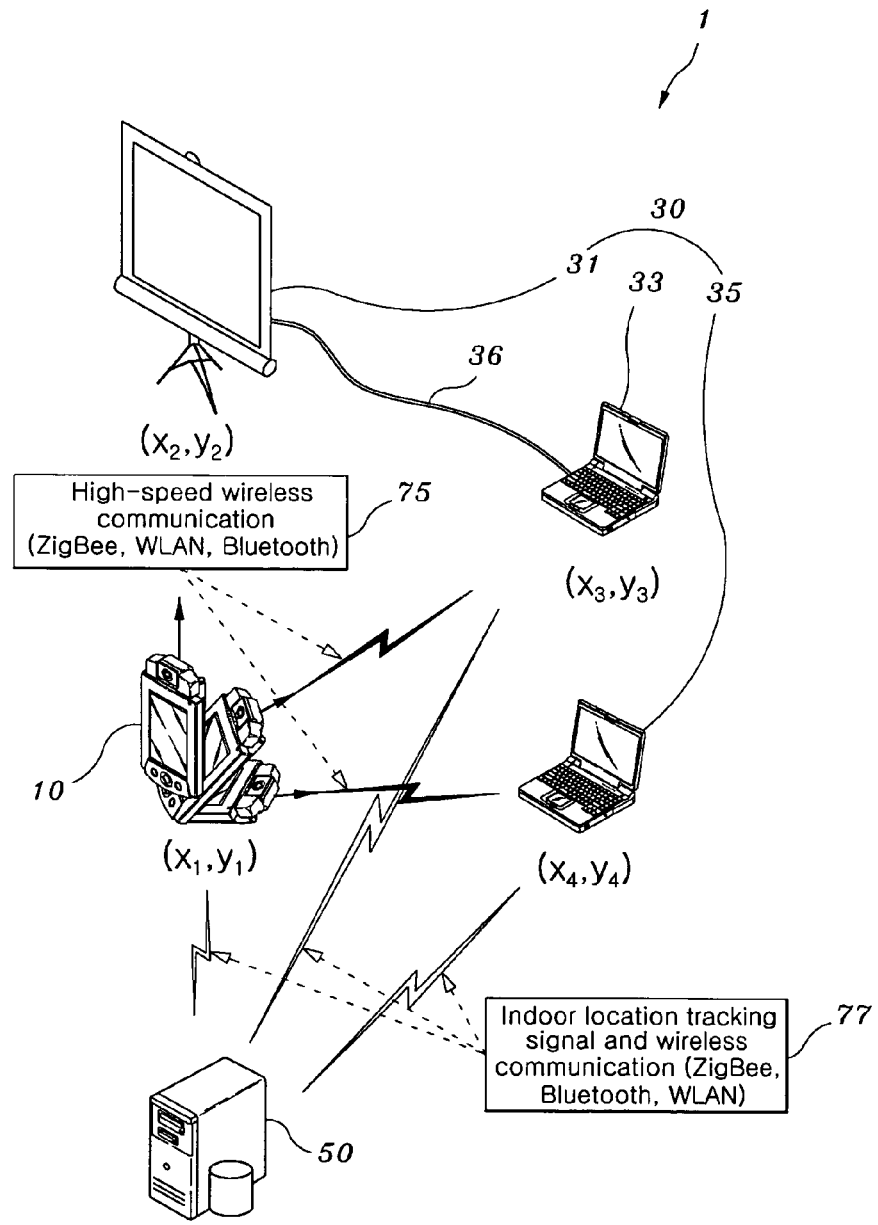

[Figure 2]
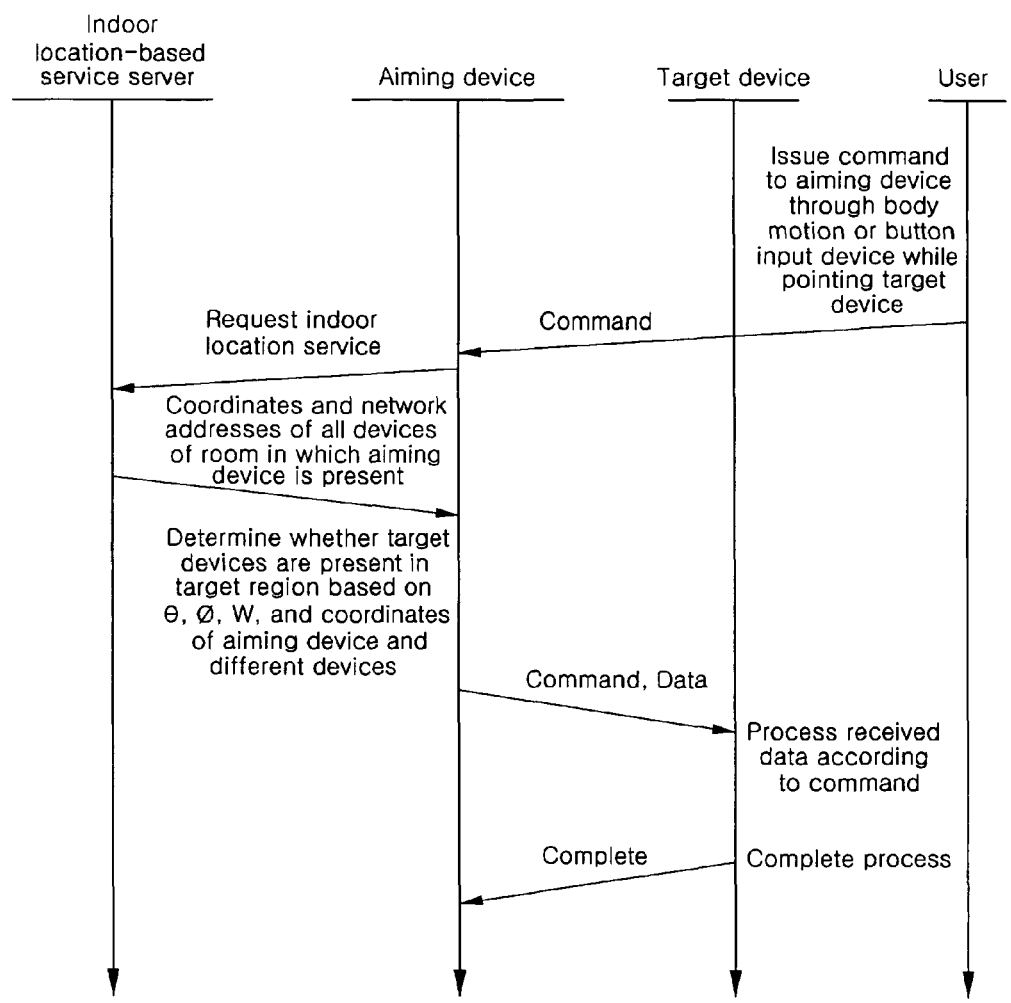

[Figure 3]
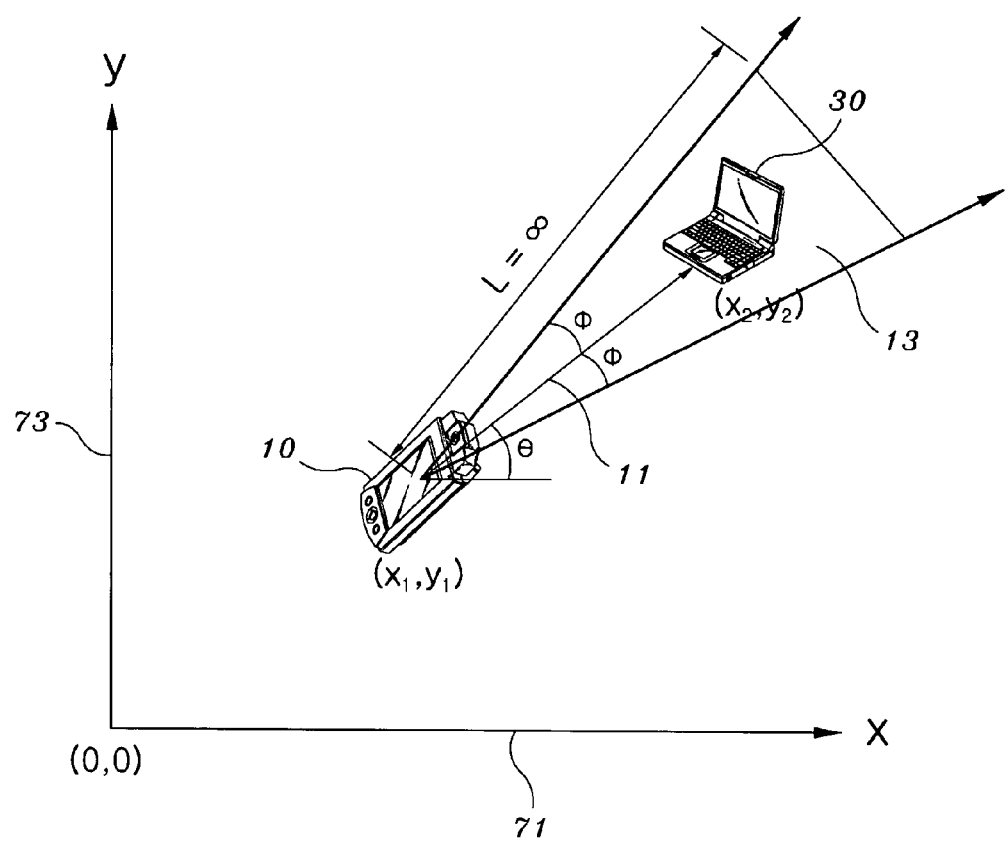

[Figure 4]
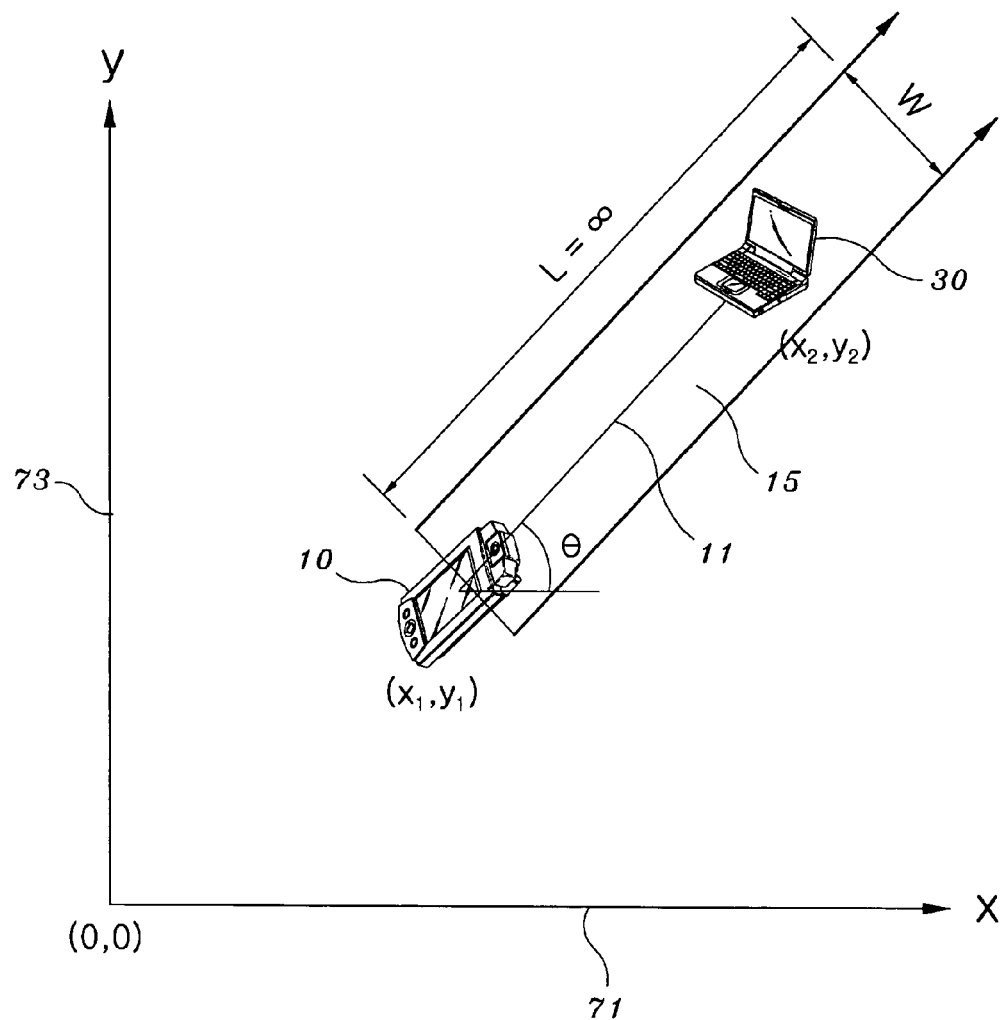

[Figure 5]
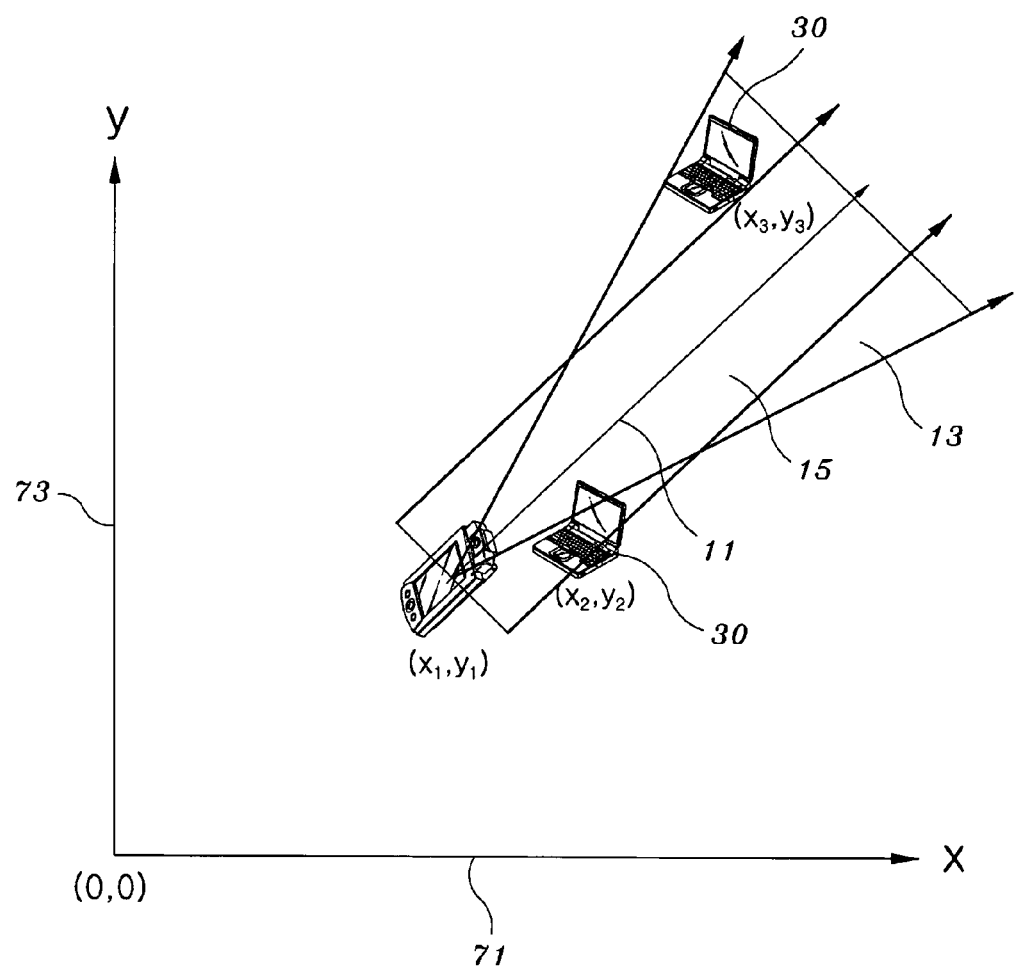

[Figure 6]
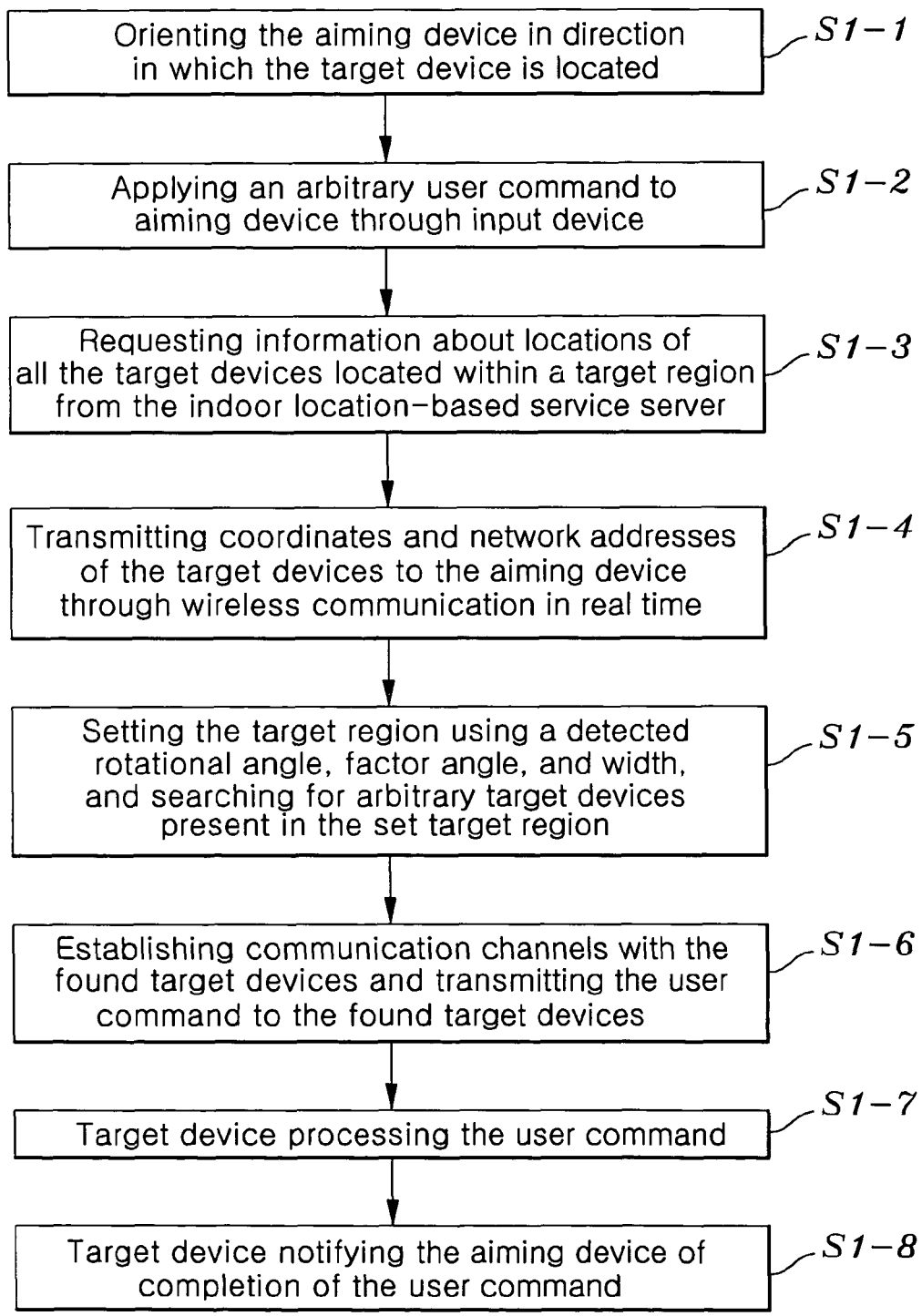

[Figure 7]
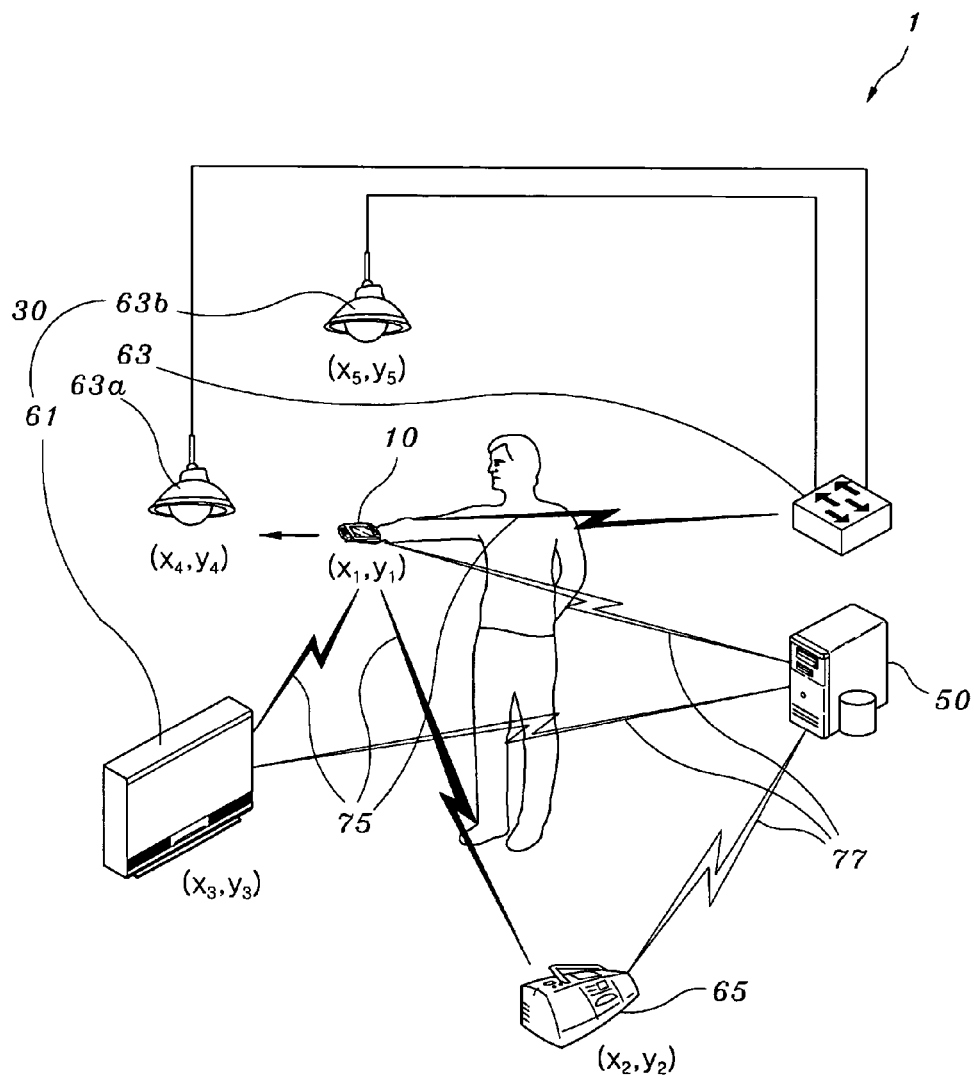

[Figure 8]
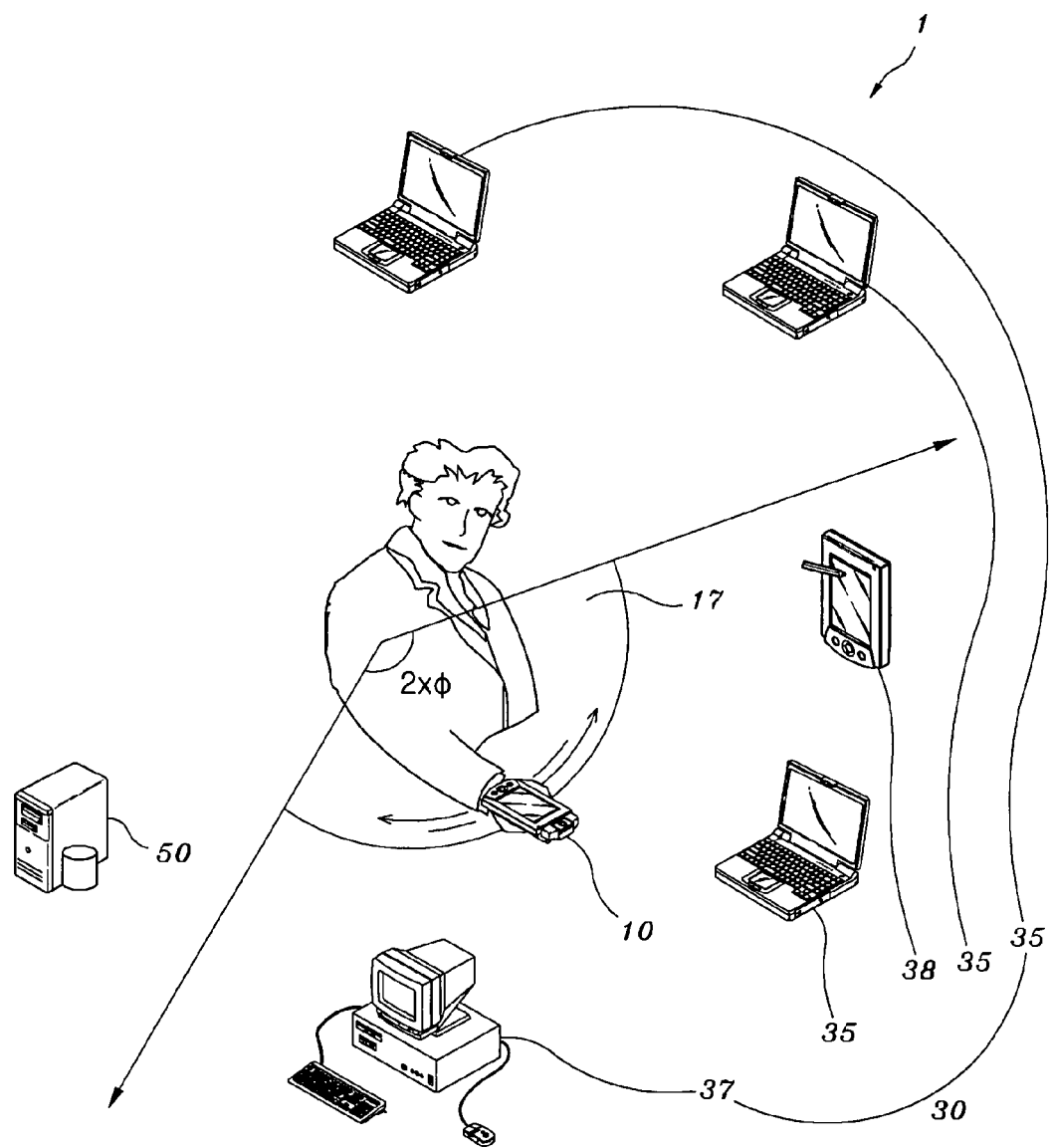

[Figure 9]
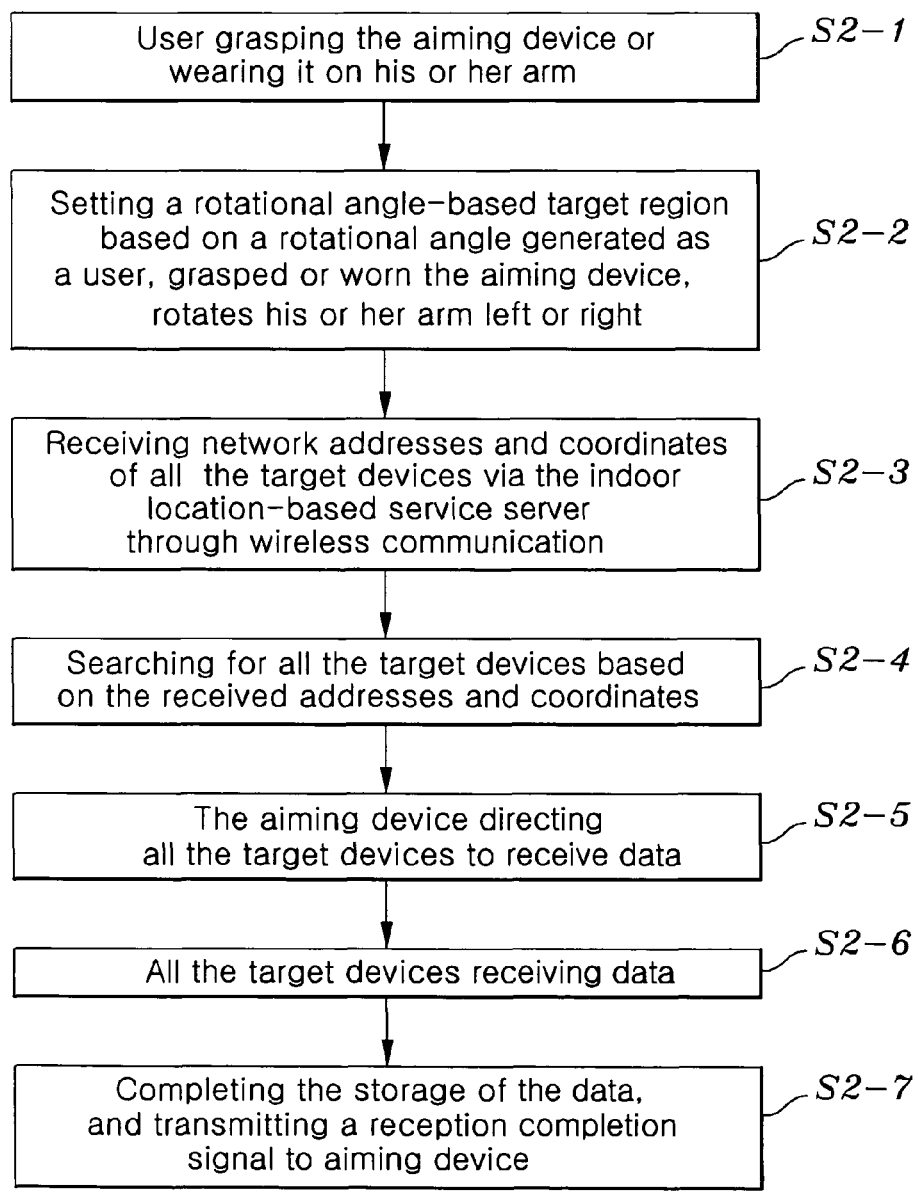

[Figure 10]
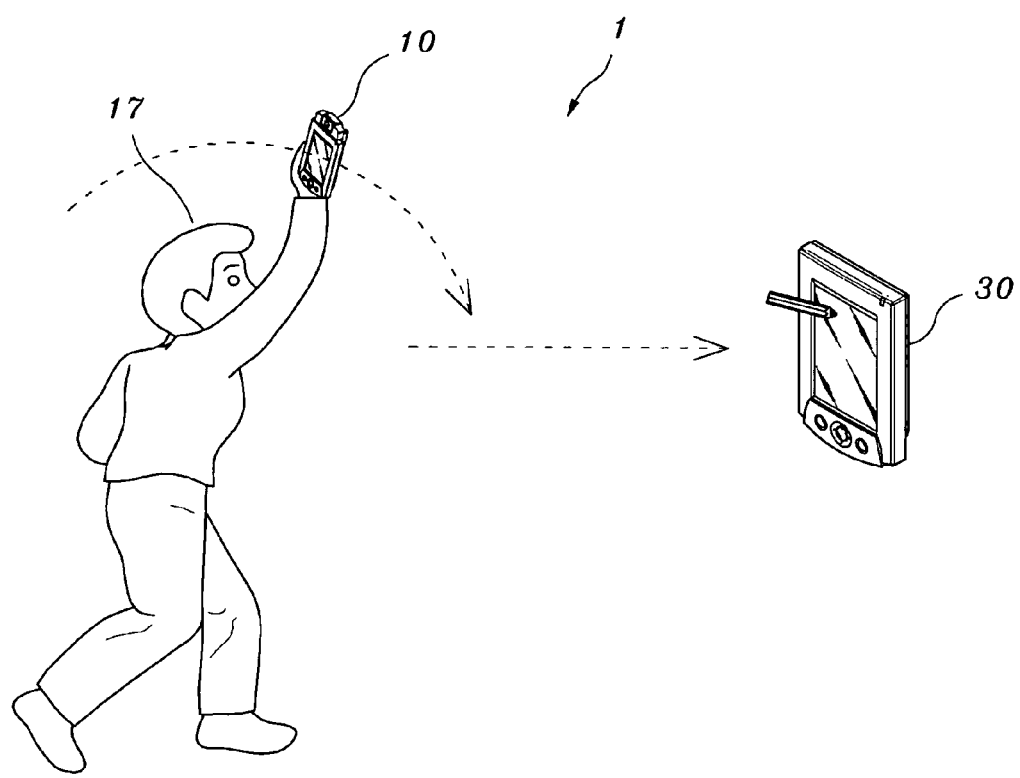

INTUITIVE REAL SPATIAL AIMING-BASED SYSTEM, IDENTIFICATION AND COMMUNICATION METHODS FOR IDENTIFYING NEAR BY DEVICES TO FORM A NETWORK WITHIN A REGION

BACKGROUND OF THE INVENTION

1. Field of the Invention

The present invention relates generally to an intuitive real spatial aiming-based system, and identification and communication methods using the intuitive real spatial aiming-based system and, more particularly, to an intuitive real spatial aiming-based system, and identification and communication methods using the intuitive real spatial aiming-based system, which can locate target devices located a long distance away based on angle-based and width-based target regions using an electronic compass having a magneto resistive sensor and an indoor location-based service server, which can detect a user's gesture using an accelerometer and execute intuitive commands based on the detected gesture, and which can make connections to the target devices through wireless communication, such as ZigBee, Bluetooth or Wireless Local Area Network (WLAN), based on direction setting and aiming motion and perform intuitive and remote control on the target devices, thus being capable of transmitting and receiving data.

2. Description of the Related Art

Recently, mobile devices, such as Personal Digital Assistants (PDAs) and notebook computers, as well as desktop computers, have become widely used. Wireless communication, such as Wireless Local Area Network (WLAN) communication, is being universalized between the mobile devices. That is, the ubiquitous computing age based on widely popularized devices capable of wireless communication is coming.

Here, the term "ubiquitous computing" means an environment in which users can acquire necessary information through a network regardless of place. Ubiquitous computing requires a condition that devices must be convenient to carry and is based on a basic concept of tracking users' locations and then providing various services to the users, which is currently in an early stage.

Such ubiquitous computing is chiefly used for file transfer, such as the transmission or reception of messages, through wireless communication between computer devices. To realize such file transfer, there are a method in which a user orients his or her computer towards a target computer and then connects the two computer to each other through infrared communication, and a method in which a list of computers connected over a wireless network is displayed on a user's computer screen and the name or nickname of a target computer is selected from the list, so that a connection is made via a WLAN.

The method of making a connection to a target computer through infrared communication is problematic in that a transmission rate is low, computers interconnected through the infrared communication cannot be removed form each other during communication, and the connection is interrupted when an obstacle enters the space between the computers. Furthermore, the method of making a connection to a target computer through a WLAN by selecting the name or nickname of the target computer is problematic in that it is not easy to search for the name or nickname of the target computer in a list of the plurality of computers, and the user must know the name or nickname of the target computer in advance.

Meanwhile, various methods have been proposed to solve these problems. First, there is a method in which, when an infrared transmitter/receiver for transmitting a device identification number is attached to each device, a pen to which an infrared transmitter/receiver is attached, is brought within the vicinity of the infrared identifier attached to each device and the button of the pen is pressed, the network address of the device is received by the pen and is then transferred to the user's mobile computer, such as a PDA.

Accordingly, even if the user does not know the network address of each device, a target can be directly detected without using an indirect means. That is, intuitive communication depending on a pointing motion can be established in the vicinity of the identifier of the device.

However, the above-described method is problematic in that each device must be equipped with an infrared identifier that is easily visible, and it is difficult to remotely control and access the device from beyond a predetermined distance, so that the control and access must be performed from a short distance, therefore it is influenced by the distance.

Second, there is a method in which a somewhat wide solar cell panel is attached to a target device, a laser signal on which the network address of the user's computer is carried is aimed at the target device, and then the target device establishes communication with the user's computer through a WLAN.

In this method, the laser signal is injurious to the human body and eyes, and each computer device must be provided with the somewhat large solar cell panel, the appearance of which is not good.

The method is disadvantageous in that, in the case where the target computer device is a small-sized PDA, the solar cell panel having a size larger than that of the main body of the computer device cannot be attached to the computer device, and the solar cell panels of computer devices must face a user.

Third, there is a method that allows laser transmitters/receivers to exchange network addresses therebetween. This is problematic in that it is difficult to aim at a target in the distance because laser light has excessively strong directionality.

SUMMARY OF THE INVENTION

Accordingly, the present invention has been made keeping in mind the above problems occurring in the prior arts, and an object of the present invention is to provide an intuitive real spatial aiming-based system using the intuitive real spatial aiming-based system, which can locate target devices located a long distance away based on angle-based and width-based target regions using an electronic compass having a magneto resistive sensor, and an indoor location-tracking sensor, which can detect a user's gesture using an accelerometer and execute intuitive commands based on the detected gesture, which can make connections to the target devices through wireless communication, such as ZigBee, Bluetooth or WLAN communication, based on a setting direction and aiming motion and perform intuitive and remote control on the target devices, thus being capable of transmitting and receiving data, and which enable the control of home appliances as well as computers, thus being capable of being applied in real life.

Another object of the present invention is to provide identification and communication methods using the intuitive real spatial aiming-based system.

In order to accomplish the above object, the present invention provides an intuitive real spatial aiming-based system for identifying the indoor locations and coordinates of one or more devices located indoors and remotely controlling the respective devices, including an aiming device including a mobile computer or a PDA, which is provided with a first high-speed wireless communication means, a first location tracking sensor, and an electronic compass having a magneto resistive sensor for detecting a direction; target devices each including a fixed computer, a home appliance, a PDA, or a mobile communication terminal, which is selectively provided with a second high-speed wireless communication means and a second location tracking sensor; and an indoor location-based service server for tracking the indoor locations and coordinates of the aiming device and the target devices in real time.

It is preferred that the indoor location-based service server be configured to track the indoor locations of the aiming device and the target devices through separate indoor location tracking signals or through high-speed wireless communication, such as ZigBee, Bluetooth, or WLAN communication.

In addition, the present invention provides an identification method using an intuitive real spatial aiming-based system, the intuitive real spatial aiming-based system including an aiming device including a mobile computer or a PDA, which is provided with a first high-speed wireless communication means, a first location tracking sensor, and an electronic compass having a magneto resistive sensor for detecting a direction; target devices each including a fixed computer, a home appliance, a PDA, or a mobile communication terminal, which is selectively provided with a second high-speed wireless communication means and a second location tracking sensor; and an indoor location-based service server for tracking the indoor locations and coordinates of the aiming device and the target devices in real time, the identification method including the steps of: the indoor location-based system tracking the coordinates of the aiming device and the target devices, and the aiming device setting a target region according to the aiming direction of the aiming device provided with the electronic compass having the magneto resistive sensor; and the aiming device searching for the target devices within the set target region, and identifying the target devices.

It is preferred that, when a central axis in a direction in which the aiming device is oriented forms a first angle with an x axis, the target region include an angle-based target region that is defined as the region between two indefinitely long straight lines that are spaced apart from the central axis by a second predetermined angle and formed in a fan shape.

Furthermore, it is preferred that, when a central axis in a direction in which the aiming device is oriented forms a first angle with an x axis, the target region includes a width-based region that is defined as the region between two infinitely long parallel straight lines spaced apart from the central axis by a predetermined width.

Furthermore, it is preferred that when a central axis in a direction in which the aiming device is oriented forms an x axis in a first angle, the target region includes both an angle-based target region, which is defined as the region between two infinitely long straight lines that are spaced apart from the central axis by a second predetermined angle and formed in a fan shape, and a width-based region, which is defined as the region between two infinitely long parallel straight lines spaced apart from the central axis by a predetermined width.

Alternatively, the present invention provides a communication method using an intuitive real spatial aiming-based system, the intuitive real spatial aiming-based system including an aiming device including a mobile computer or a PDA, which is provided with a first high-speed wireless communication means, a first location tracking sensor, and an electronic compass having a magneto resistive sensor for detecting a direction; target devices each including a fixed computer, a home appliance, a PDA, or a mobile communication terminal, which is selectively provided with a second high-speed wireless communication means and a second location tracking sensor; and an indoor location-based service server for tracking the indoor locations and coordinates of the aiming device and the target devices in real time, the communication method including the steps of: orienting the aiming device, which is provided with the electronic compass having the magneto resistive sensor, in a direction in which the target device is located; applying an arbitrary user command, such as a file transfer, to the aiming device through any one of body motion, voice, and button input devices; the aiming device requesting information about locations of all the target devices located within a target region from the indoor location-based service server; the indoor location-based service server transmitting the coordinates and network addresses of the target devices to the aiming device through wireless communication in real time; the aiming device setting the target region using a detected rotational angle, factor angle, and width of the target region, and searching for arbitrary target devices present in the set target region; the aiming devices establishing communication channels with the found target devices and transmitting the user command to the found target devices; the target devices processing the user command; and the target device notifying the aiming device of the completion of the user command.

In addition, present invention provides an intuitive real spatial aiming-based system for identifying the indoor locations and coordinates of one or more devices located indoors and remotely controlling the respective devices, comprising: an aiming device including a mobile computers or a PDA, which is provided with a first high-speed wireless communication means, a location tracking sensor, an electronic compass, and an accelerometer for detecting a user's motion; target devices including a desktop computer, a mobile computer, a PDA, or a mobile communication terminal, which is selectively provided with both a second high-speed wireless communication means and a second location tracking sensor; and an indoor location-based service server for tracking the indoor locations and coordinates of the aiming device and the target devices in real time.

The aiming device is configured to communicate with the target devices through high-speed wireless communication, such as ZigBee, Bluetooth and WLAN communication.

In addition, the present invention provides an identification method using an intuitive real spatial aiming-based system, the intuitive real spatial aiming-based system including an aiming device including a mobile computers or a PDA, which is a first high-speed wireless communication means, a location tracking sensor, an electronic compass, and an accelerometer for detecting a user's motion; target devices including a desktop computer, a mobile computer, a PDA, or a mobile communication terminal, which is selectively provided with both a second high-speed wireless communication means and a second location tracking sensor; and an indoor location-based service server for tracking the indoor locations and coordinates of the aiming device and the target devices in real time, the identification method including the steps of: setting a rotational angle-based target region based a rotational angle generated as a user's arm rotates left or right after the user has grasped the aiming device or has worn it on his or her arm; and the aiming device searching for target devices within the set rotational angle-based target region through the indoor location-based service server, and identifying the target devices.

Alternatively, the present invention provides a communication method using an intuitive real spatial aiming-based system, the intuitive real spatial aiming-based system including an aiming device including a mobile computers or a PDA, which is a first high-speed wireless communication means, a location tracking sensor, an electronic compass, and an accelerometer for detecting a user's motion; target devices including a desktop computer, a mobile computer, a PDA, or a mobile communication terminal, which is selectively provided with both a second high-speed wireless communication means and a second location tracking sensor; and an indoor location-based service server for tracking the indoor locations and coordinates of the aiming device and the target devices in real time, the communication method including the steps of: a user grasping the aiming device or wearing it on his or her arm; setting a rotational angle-based target region based on a rotational angle generated as a user, having grasped or worn the aiming device, rotates his or her arm left or right; the aiming device receiving the network addresses and coordinates of all the target devices via the indoor location-based service server through wireless communication; searching for all the target devices within the rotational angle-based target region set based on the received addresses and coordinates; the aiming device directing all the target devices within the rotational angle-based target region to receive data through wireless communication; all the target devices receiving the data according to a transfer command from the aiming device; and each of the target devices completing the storage of the data, and transmitting a reception completion signal to the aiming device.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram schematically showing the construction of an intuitive real spatial aiming-based system according to the present invention;

FIG. 2 is a flowchart schematically illustrating an identification method using the intuitive real spatial aiming-based system according to the present invention;

FIG. 3 is a coordinate diagram schematically showing an example of applying an angle-based target region technique based on the identification method using intuitive real spatial aiming-based system according to the present invention;

FIG. 4 is a coordinate diagram schematically showing an example of applying a width-based target region technique based on the identification method using the intuitive real spatial aiming-based system according to the present invention;

FIG. 5 is a coordinate diagram schematically showing an example of applying both angle-based and width-based target region techniques based on the identification method using the intuitive real spatial aiming-based system according to the present invention;

FIG. 6 is a flowchart illustrating a communication method using the intuitive real spatial aiming-based system according to an embodiment of the present invention;

FIG. 7 is a diagram showing an embodiment in which the intuitive real spatial aiming-based system, the identification method and communication methods using the intuitive real spatial aiming-based system according to the present invention are applied to home appliances;

FIG. 8 is a diagram showing another embodiment in which the system, the identification method, and the communication method using intuitive real spatial aiming according to the present invention are applied to home appliances;

FIG. 9 is a flowchart illustrating a communication method using the intuitive real spatial aiming-system according to another embodiment of the present invention; and FIG. 10 is a diagram showing another embodiment of the present invention.

DESCRIPTION OF THE PREFERRED EMBODIMENTS

Embodiments according to the present invention are described in detail with reference to the accompanying drawings below. FIG. 1 is a diagram schematically showing the construction of an intuitive real spatial aiming-based system according to the present invention, FIG. 2 is a flowchart schematically illustrating an identification method using the intuitive real spatial aiming-based system according to the present invention, FIG. 3 is a coordinate diagram schematically showing an example of applying an angle-based target region technique based on the identification method using intuitive real spatial aiming-based system according to the present invention, FIG. 4 is a coordinate diagram schematically showing an example of applying a width-based target region technique based on the identification method using the intuitive real spatial aiming-based system according to the present invention, FIG. 5 is a coordinate diagram schematically showing an example of applying both angle-based and width-based target region techniques based on the identification method using the intuitive real spatial aiming-based system according to the present invention, and FIG. 6 is a flowchart illustrating a communication method using the intuitive real spatial aiming-based system according to an embodiment of the present invention.

As shown in FIG. 1, the intuitive real spatial aiming-system 1 according to the present invention includes an aiming device 10 provided with a mobile computer or a PDA, and one or more target devices 30 each provided with a fixed computer, a mobile computer, a home appliance, a PDA, or a mobile communication terminal.

Each of the aiming device 10 and the target device 30 is provided with a high-speed wireless communication means and a location tracking sensor, and the aiming device 10 is provided with an electronic compass having a magneto resistive sensor for detecting directions.

Meanwhile, the aiming device 10 includes an electronic compass having a two-dimensional magneto resistive sensor to detect the rotating angle of the aiming device 10 in a two-dimensional plane. An indoor location-based service server 50 for tracking the indoor locations and coordinates of the aiming device 10 and the target device 30 in real time is provided at an appropriate indoor location.

Although, in an embodiment of the present invention, the aiming device 10 is provided with the electronic compass having the two-dimensional magneto resistive sensor to detect the rotating angle of the aiming device 10 in a two-dimensional plane, the application thereof may be extended to three-dimensional space pointing, or an electronic compass having a three-dimensional magneto resistive sensor may be further included in the aiming device 10 in order to provide a more accurate rotational angle.

In this case, the aiming device 10 and the target device 30 are configured to allow the indoor location-based service server 50 to track the locations thereof using separate indoor location tracking signals 77 that are respectively generated by the location tracking sensors provided in the aiming device 10 and the target device 30 or using high-speed wireless communication 75 that is performed by the high-speed wireless communication means, and to perform wireless communication with the indoor location-based service server 50.

An identification method in the intuitive real spatial aiming-based system according to the present invention, which has the structure and the construction described above, is described in detail with reference to FIGS. 1 and 2.

The target devices 30 include a screen computer 33 and a mobile computer 35. The screen computer 33 is connected to a large-sized screen 31 using a cable 36. Meanwhile, the fixed device, like the large-sized screen 31, is configured to manually record the coordinates of the large-sized screen 31 without the location detection of the indoor location-based service server 50.

The identification method in the real spatial aiming-based system 1 is described. First, when the aiming device 10 is oriented toward the large-sized screen 31, the screen computer 33 or the mobile computer 35 by a user, it sets a target region according to the direction of the aiming device 10 that includes the electronic compass having the magneto resistive sensor and then searches for the target devices 30 provided in the target region.

In this case, the coordinates of the aiming device 10 and the target devices 30 are tracked by the indoor location-based service server 50 using the indoor location tracking signals 77 generated by the location tracking sensors that are provided in the aiming device 10 and the target devices 30. The tracked indoor locations and coordinates of the aiming device 10 and the target devices 30 are transmitted to the aiming device 10 in real time using the high-speed wireless communication 75. The aiming device 10 searches for the target devices 30 based on the received indoor locations and coordinates and then identifies the target devices 30.

By doing so, a user command can be transmitted after an aiming direction is set such that the aiming device 10 is oriented toward the mobile computer 35 or the screen computer 33.

The embodiment of the present invention is configured such that the user command is performed after the target region is set by the aiming device 10 and the indoor locations and coordinates of the target devices 30 in the set target region are searched for, and it may be also possible to allow the target devices 30 and the aiming device 10 to play reverse roles such that the user command is executed after the target region is set by the target devices 30 and the indoor locations and coordinates of the aiming device 10 in the set target region are searched for.

Meanwhile, when the aiming direction of the aiming device 10 is set to be oriented toward the large-sized screen 31 and then a user's command is applied, a target region is set by the aiming device 10 having the electronic compass provided with the magneto resistive sensor, and the indoor location-based service server 50 determines whether the coordinates of the large-sized screen 31 are in the target region. In this case, the large-sized screen 31 is not an intelligent device that is capable of performing wireless communication, so that the network address of the screen computer 33 connected to the large-sized screen 31 using a cable 36 is set to be identical to that of the large-sized screen 31, and the network address and fixed coordinate of the large-sized screen 31 are manually recorded in the indoor location-based service server 50.

Accordingly, when the aiming device 10 issues a command toward the large-sized screen 31, the command is issued to the screen computer 33 because the network address of the large-sized screen 31 and the network address of the screen computer 33 are the same.

For this purpose, the target devices 30, such as the screen computer 33, and the mobile computer 35, are connected to the indoor location-based service server 50 by a high-speed wireless communication means, such as ZigBee, Bluetooth, or WLAN, based on the high-speed wireless communication 75, and the screen computer 33 is connected with the large-sized screen 31 using the cable 36 and is configured to control the large-sized screen 31.

In an embodiment of the present invention, it is preferred that the indoor location-based service server 50, the target devices 30 and the aiming device 10 be wirelessly connected to each other through the high-speed wireless communication 75, such as ZigBee, Bluetooth, or WLAN communication, but are not limited thereto.

Meanwhile, in a method of setting the target region depending on the aiming direction of the aiming device 10, when a central axis 11 in the direction in which the aiming device 10 is oriented forms a angle θ with an x axis 71, the target region may include the angle-based target region 13 shown in FIG. 3, which is defined as the region that is formed between two infinitely long straight lines that are spaced apart from the central axis 11 by a predetermined angle Ø, and formed in a fan shape, or a width-based region 15 shown in FIG. 4, which is defined as the region that is formed between two infinitely long parallel straight lines spaced apart from the central axis 11 by a predetermined width W.

That is, the angle-based target region 13 has two-dimensional coordinates for an x axis 71 and a y axis 73 according to the direction of the aiming device 10. When the central axis 11 in the direction in which the aiming device 10 is oriented is formed with the x axis 71 in an angle θ, the region that is formed between two infinitely long straight lines spaced apart from the central axis 11 by a predetermined angle Ø may be the angle-based target region 13, and devices present in the target region may be the target devices 30.

In the case where it is desired to three-dimensionally search the target region to find the target device 30, a z axis is separately added, a target region is set, and the target devices 30 are searched for in the set target region.

Meanwhile, when the target devices 30 are located close to the aiming device 10, the case where it is estimated that the target device 30 is not present in the angle-based target region 13 may occur due to coordinate error and angle error even if the aiming device 10 is oriented toward the target device 30. Conversely, when the target device 30 is located far away from the aiming device 10, the case where it is estimated that the target device 30 is not present in the width-based target region 15 may occur due to coordinate error and angle error even if the aiming device 10 is oriented towards the target device 30. For these reasons, in the case where a target region depending on an aimed direction is set, it is preferred that the target region be set so as to include both the angle-based and width-based target regions 13 and 15 as shown in FIG. 5.

In the present invention, the target region is set in such a manner that the target devices 30 are not included in the angle-based target region 13 but are included in the width-based target region 15 in the case where they are located close to the aiming device 10, and the target devices 30 are not included in the width-based target region 15 but are included in the angle-based target region 13 in the case where they are located far away from the aiming device 10. Accordingly, the target region depending on the aiming direction of the aiming device 10 can be more accurately set.

A communication method using the intuitive real spatial aiming-based system according to the present embodiment is described with reference to FIGS. 1 to 6 below.

First, the aiming device 10, which is provided with the electronic compass having the magneto resistive sensor, is located to face the direction in which the target device 30 is located at step S1-1.

Thereafter, a user applies an arbitrary user command, such as a file transfer, to the aiming device 10 through any one of body motion, voice, and button input devices at step S1-2.

The aiming device 10 requests information about the locations of the indoor target devices located within a target region from the indoor location-based service server 50 at step S1-3.

The indoor location-based service server 50 transmits the coordinates and network addresses of the target devices to the aiming device 10 through wireless communication in real time at step S1-4.

The aiming device 10 sets the target region using a detected rotational angle θ, factor angle Ø, and width W of the target region, and searches for arbitrary target devices 30 present in the set target region at step S1-5.

The aiming device 10 establishes communication channels with the found target devices, and transmits the user command to the found target devices at step S1-6.

The target devices 30 process the user command at step S1-7.

The target devices 30 notify the aiming device 10 of the completion of the user command.

In this case, the user command is not limited only to the file transfer, and may be implemented in various ways, for example, for message exchange, video chatting or the like, according to the establishment of communication channels. In the file transfer, it is preferred that each of the target devices 30 be configured to store received data or to processes the data.

Another embodiment based on the communication method using the intuitive real spatial aiming-based system having the structure and the construction described above will be described. In the present embodiment, the above-described method is not limited only to computers, and may be extended to home appliances, such as an indoor electric lamp, an audio device and a TeleVision (TV), which are used in daily life.

As shown in FIG. 7, an intuitive real spatial aiming-based system 1 according to the present embodiment includes a TV 61, an audio device 65, and two electric lamps 63a and 63b that are installed indoors so as to be independently turned on/off under the control of an electric lamp controller 63. An indoor location-based service server 50 is provided at an appropriate location.

The indoor location-based service server 50 tracks and collects the indoor locations and coordinates of an aiming device 10 and target devices 30, such as the TV 61, the audio device 65 and the electric lamp controller 63, in real time using location tracking signals 77.

Meanwhile, since the coordinates of the two electric lamps 63a and 63b, which are installed so as to be independently turned on/off under the control of the electric lamp controller 63, are fixed at all times, the coordinates are manually assigned through the indoor location-based service server 50, whereas the coordinates of the target devices 30, such as the TV 61, the audio 65 and the lamp controller 63, are tracked and controlled through the indoor location tracing signal 77 and high-speed wireless communication 75.

In the present embodiment having the structure described above, when a user desires to control a desired device, the user first sets the aiming direction of the aiming device 10 such that the aiming device 10 is oriented towards any one of the target devices 30, and searches for arbitrary targets devices using the target region of the aiming device 10, in which the electronic compass having the magneto resistive sensor is provided, and the indoor locations and coordinates of the target devices for the indoor location-based service server 50, so that data transmission and reception with the target devices 30 can be performed after searching for and identifying the target devices 30.

FIG. 8 is a diagram showing another embodiment in which the intuitive real spatial aiming-based system, the identification and communication methods using an intuitive real spatial aiming-based system according to the present invention are applied to home appliances, and FIG. 9 is a flowchart illustrating a communication method using an intuitive real spatial aiming-based system according to the present invention, which indicate a target region set depending on a user's gesture.

As shown in FIG. 8, the intuitive real spatial aiming-based system according to the present embodiment includes an aiming device 10, including a mobile computer or a PDA, which is provided with a high-speed wireless communication means, a location tracking sensor, an electronic compass having a magneto resistive sensor, and an accelerometer for detecting a user's motion, target devices 30, including a desktop computer 37, a mobile computer 35 and a PDA 38. Furthermore, the intuitive real spatial aiming-based system 1 further includes an indoor location-based service server 50 for tracking the indoor locations and coordinates of the aiming device 10 and the target devices 30 in real time.

The aiming device 10 and the target device 30 have location tracking sensors, respectively. Each of the target devices 30 is configured such that communication with the aiming device 10 can be performed using a high-speed wireless communication means. The aiming device 10 and the target devices 30 are configured such that the locations thereof are tracked in real time by the indoor location-based service server 50.

Meanwhile, in the case where the user grasps the aiming device 10 with his or her hand, or wears the aiming device 10 on his or her arm and then swings the arm left and right, the accelerometer provided in the aiming device 10 is configured to detect the user's motion.

Although the accelerometer provided in the aiming device 10 is provided with an acceleration sensor and is configured to detect acceleration, it is preferred that the accelerometer be configured to be used to detect the trajectory of the user's arm by integrating the acceleration in an actual application.

Although, in the present embodiment, the target devices 30 include the desktop computer 37, the mobile computer 35 and the PDA 38, it may be possible that the target devices 30 also include a home appliance and a mobile communication terminal.

The aiming device 10 is configured such that communication with the target devices 30 can be performed through high-speed wireless communication, such as ZigBee, Bluetooth, or WLAN communication.

As shown in FIG. 8, the identification method using the intuitive real spatial aiming-based system 1 according to the present embodiment, which has the structure and construction described above, sets the region, which is formed by a rotational angle (2×Ø) generated as the user grasps the aiming device 10, including the electronic compass and the accelerometer, or wears the aiming device 10 on his or her arm, and rotates the aiming device 10 by swinging the arm left and right, that is, the region that is formed between a straight line at which rotation starts and a straight line at which rotation ends and formed in a fan shape, to a rotational angle-based target region 17.

In the rotational angle-based target region 17, the predetermined fixed angle Ø of the angle-based target region 13 corresponds to the half of the actual rotational angle (2×Ø), and the remaining operational principles are the same as those for the angle-based target region 13.

Thereafter, the aiming device 10 searches for the target devices 30 within the set rotational angle-based target region 17 and then identifies the target devices 30.

In this manner, when the user grasps the aiming device 10 or wears it on his or her arm and then swings the arm left and right, the aiming device 10 receives the network addresses and coordinates of all devices from the indoor location-based service server 50, sets the rotational angle-based target region 17 based on the coordinates and direction of the aiming device 10 and the angle obtained by rotating the arm, searches for the network addresses of the target devices 30 present in the set rotational angle-based target region 17, and then transmits data to respective target devices 30 present in the set rotational angle-based target region 17.

An identification method using an intuitive real spatial aiming-based system according to the present embodiment is described with reference to FIG. 9 below.

First, a user grasps the aiming device 10 or wears it on his or her arm at step S2-1.

A rotational angle-based target region 17 is set based on a rotational angle 2×Ø generated as the user, having grasped or worn the aiming device 10, rotates his or her arm left or right.

The aiming device 10 receives the network addresses and coordinates of the target devices 30 through the indoor location-based service server 50 by wireless communication at step S2-3.

The plurality of target devices 30, such as the desktop computer 37 and the mobile computer 35, that are provided in the rotational angle-based target region 17 set based on the received addresses and coordinates, are searched for at step S2-4.

The aiming device 10 directs each of the target devices 30 within the rotational angle-based target region to receive data through wireless communication at step S2-5.

Each of the target devices 30 receives the data according to a transfer command from the aiming device 10 at step S2-6.

Each of the target devices 30 completes the storage of the data, and transmits a reception completion signal to the aiming device 10.

As described above, a series of intuitive tasks can be performed as the user makes a gesture toward the aiming device 10, the rotational angle-based target region 17 can be set according to a rotational range defined by a left and right swing gesture, and the data can be transmitted to all the target devices 30 provided in the set rotational angle-based target region 17.

FIG. 10 is a diagram showing another embodiment of the present invention.

As shown in FIG. 10, in the present embodiment, when a user grasps an aiming device 10 or wears it, and then makes a gesture that seems to draw it toward arbitrary target devices 30, data is transmitted from the aiming device 10 to the target devices 30 through wireless communication.

That is, when the user makes a gesture that seems to draw the aiming device 10 toward the target devices 30 each including a mobile computer, a desktop computer, a PDA, or a mobile communication terminal, the data of the aiming device 10 is transmitted to the target device 30.

As described above, the present invention, having the construction described above, can locate target devices located a long distance away based on angle-based and width-based target regions using an electronic compass, having a magneto resistive sensor, and an indoor location-based service server, can detect a user's gesture using an accelerometer and execute an intuitive command based on the detected gesture, and can make connections to the target devices through wireless communication, such as ZigBee, Bluetooth or WLAN communication, based on a setting direction and aiming motion, and perform intuitive and remote control on the target devices, thus being capable of transmitting and receiving data. Furthermore, the present invention enables the control of home appliances as well as computers, thus being capable of being applied in real life.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An identification method using an intuitive real spatial aiming-based system, the intuitive real spatial aiming-based system including an aiming device including a mobile computer or a PDA, which is provided with first high-speed wireless communication means, a first location tracking sensor, and an electronic compass having a magneto resistive sensor for detecting a direction; target devices each including a fixed computer, a home appliance, a PDA, or a mobile communication terminal, which is selectively provided with second high-speed wireless communication means and a second location tracking sensor; and an indoor location-based service server for tracking indoor locations and coordinates of the aiming device and the target devices in real time, the identification method comprising the steps of:

tracking by the indoor location-based system the coordinates of the aiming device and the target devices; setting by the aiming device a target region according to an aiming direction of the aiming device provided with the electronic compass having the magneto resistive sensor; wherein, detecting when a central axis in a direction in which the aiming device is oriented forms an x axis in a first angle, as the target region includes both an angle-based target region, defining as a region between two infinitely long straight lines that are spaced apart from the central axis by a second predetermined angle and formed in a fan shape, and a width-based region, which is defined as a region between two infinitely long parallel straight lines spaced apart from the central axis by a predetermined width; and searching by the aiming device for the target devices within the set target region, and identifying the target devices.

2. A communication method using an intuitive real spatial aiming-based system, the intuitive real spatial aiming-based system including an aiming device including a mobile computer or a PDA, which is provided with first high-speed wireless communication means, a first location tracking sensor, and an electronic compass having a magneto resistive sensor for detecting a direction; target devices each including a fixed computer, a home appliance, a PDA, or a mobile communication terminal, which is selectively provided with second high-speed wireless communication means and a second location tracking sensor; and an indoor location-based service server for tracking indoor locations and coordinates of the aiming device and the target devices in real time, the communication method comprising the steps of:

(S1-1) orienting the aiming device, which is provided with the electronic compass having the magneto resistive sensor, in a direction in which the target device is located;

(S1-2) applying an arbitrary user command, such as a file transfer, to the aiming device through any one of body motion, voice, and button input devices;

(S1-3) the aiming device requesting information about locations of all the target devices located within a target region from the indoor location-based service server, wherein, when a central axis in a direction in which the aiming device is oriented forms an x axis in a first angle, detecting where target region includes both an angle-based target region, which is defined as a region between two infinitely long straight lines that are spaced apart from the central axis by a second predetermined angle and formed in a fan shape, and a width-based region, which is defined as a region between two infinitely long parallel straight lines spaced apart from the central axis by a predetermined width;

(S1-4) the indoor location-based service server transmitting coordinates based on said detecting and network addresses of the target devices to the aiming device through wireless communication in real time;

(S1-5) the aiming device setting the target region using a detected rotational angle, factor angle, and width of the target region, and searching for arbitrary target devices present in the set target region;

(S1-6) the aiming devices establishing communication channels with the found target devices and transmitting the user command to the found target devices;

(S1-7) the target devices processing the user command; and (S1-8) the target device notifying the aiming device of completion of the user command.

* * * * *